United States Patent
Oyama et al.

(10) Patent No.: US 9,719,809 B2
(45) Date of Patent: Aug. 1, 2017

(54) OPTICAL UNIT AND DISPLACEMENT MEASURING DEVICE

(71) Applicant: TAIYO YUDEN CO., LTD., Tokyo (JP)

(72) Inventors: Katsuhiro Oyama, Tokyo (JP); Fuyuki Miyazawa, Tokyo (JP); Yasuhito Hagiwara, Tokyo (JP); Takaki Hamamoto, Tokyo (JP); Isao Matsuda, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/003,548

(22) Filed: Jan. 21, 2016

(65) Prior Publication Data
US 2016/0216101 A1 Jul. 28, 2016

(30) Foreign Application Priority Data
Jan. 23, 2015 (JP) .................................. 2015-011272

(51) Int. Cl.
| | | |
|---|---|---|
| G01D 5/347 | (2006.01) | |
| G01D 5/26 | (2006.01) | |
| G02B 27/42 | (2006.01) | |
| G01D 5/38 | (2006.01) | |

(52) U.S. Cl.
CPC ......... *G01D 5/266* (2013.01); *G01D 5/34715* (2013.01); *G01D 5/38* (2013.01); *G02B 27/4272* (2013.01)

(58) Field of Classification Search
CPC .. G01D 5/347; G01D 5/3473; G01D 5/34746; G01B 11/14
See application file for complete search history.

(56) References Cited

U.S. PATENT DOCUMENTS

| | | | | |
|---|---|---|---|---|
| 5,249,032 A | * | 9/1993 | Matsui ..................... | G01D 5/38 250/237 G |
| 5,272,512 A | * | 12/1993 | Kadowaki ............... | G01S 17/58 356/28 |
| 2011/0192964 A1 | * | 8/2011 | Makinouchi ............. | G01D 5/38 250/231.1 |
| 2012/0250031 A1 | | 10/2012 | Ikeda et al. | |

FOREIGN PATENT DOCUMENTS

| | | |
|---|---|---|
| JP | 2000-356509 A | 12/2000 |
| WO | 2011/043354 A1 | 4/2011 |

* cited by examiner

*Primary Examiner* — Jonathan Hansen
(74) *Attorney, Agent, or Firm* — Chen Yoshimura LLP

(57) ABSTRACT

An optical unit includes: a first diffraction grating where light from a light source enters; a second diffraction grating that generates interference light as a result of diffracted light rays emitted from the first diffraction grating entering the second diffraction grating; and an optical member including a pair of reflective surfaces that are parallel and opposite to each other, the optical member being configured such that the pair of reflective surfaces respectively reflect ±mth-order diffracted light rays that are diffracted light rays of a specific order among a plurality of orders of the diffracted light rays emitted from the first diffraction grating so as to guide the ±mth-order diffracted light rays to the second diffraction grating, where m is a natural number.

17 Claims, 9 Drawing Sheets

OPTICAL UNIT AND DISPLACEMENT MEASURING DEVICE

BACKGROUND OF THE INVENTION

Technical Field

The present invention relates to an optical unit that generates interference light and a displacement measuring device that measures displacement by detecting that interference light.

Background Art

Patent Document 1, for example, discloses a critical dimension measuring device that uses optical interference. According to this critical dimension measuring device, parallel beams that are emitted from a light source and traverse a half-mirror are incident on a diffraction grating, which splits the beams into zero-order light that traverses the diffraction grating and ±pth-order diffracted light. The zero-order light and ±pth-order diffracted light are each reflected by mirrors disposed at prescribed positions. Each beam of reflected light is then reflected by a half-mirror and received by a light-receiving element (see paragraphs [0036] and [0037] of the specification and FIG. 1 in Patent Document 1, for example).

Patent Document 2, meanwhile, discloses a displacement measuring device that measures the relative displacement of a pair of diffraction gratings. According to this displacement measuring device, the relative displacement of the pair of diffraction gratings corresponds to the intensity of interference light between beams of diffracted light emitted from one of the diffraction gratings in the stated pair of diffraction gratings. The displacement can be measured by detecting that intensity.

RELATED ART DOCUMENTS

Patent Documents

Patent Document 1: Japanese Patent Application Laid-Open Publication No. 2000-356509
Patent Document 2: WO 2011/043354 Pamphlet

SUMMARY OF THE INVENTION

The device disclosed in Patent Document 1 generates zero-order light (zero-order diffracted light), other orders of diffracted light aside from ±pth-order diffracted light, and so on in addition to the interference light from the ±pth-order diffracted light, and there is a risk that this other light will be received by the light-receiving element. Receiving diffracted light of other orders not needed for measurement can cause decreased measurement accuracy or erroneous measurements.

It is an object of the present invention to provide a displacement measuring device capable of improving measurement accuracy by suppressing unnecessary light from being incident on a detector, and to provide an optical unit included in such a device. Accordingly, the present invention is directed to a scheme that substantially obviates one or more of the above-discussed and other problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an optical unit, including: a first diffraction grating where light from a light source enters; a second diffraction grating that generates interference light as a result of diffracted light rays emitted from the first diffraction grating entering the second diffraction grating; and an optical member including a pair of reflective surfaces that are parallel and opposite to each other, the optical member being configured such that the pair of reflective surfaces respectively reflect ±mth-order diffracted light rays that are diffracted light rays of a specific order among a plurality of orders of the diffracted light rays emitted from the first diffraction grating so as to guide the ±mth-order diffracted light rays to the second diffraction grating, where m is a natural number.

According one aspect of the present invention, the pair of opposing parallel reflective surfaces reflects the ±mth-order diffracted light so as to guide the ±mth-order diffracted light to the second diffraction grating. Accordingly, orders of diffracted light aside from the ±mth order traverse an optical path not reflected by the pair of reflective surfaces or traverse an optical path that is reflected but not incident on the second diffraction grating. In this manner, orders of diffracted light not needed for measuring displacement can be suppressed from being incident on a detector provided in a stage subsequent to the second diffraction grating, which makes it possible to improve the accuracy of measurement.

The optical unit may include a light guide member that has the pair of reflective surfaces.

In other words, the pair of reflective surfaces may be formed integrally with the light guide member. The light guide member that includes the pair of reflective surfaces can thus be manufactured easily, and the pair of reflective surfaces can be positioned relative to each other easily as well.

The optical unit may further include a reflecting member that reflects the zero-order light ray emitted from the first diffraction grating so as to guide the zero-order light ray to a different position from a position of the second diffraction grating.

Through this, the zero-order light, which is not needed for measurement, is not incident on the detector, which makes it possible to improve the measurement accuracy.

The optical unit may further include a reflecting member provided integrally with the light guide member, the reflecting member reflecting the zero-order light ray emitted from the first diffraction grating so as to guide the zero-order light ray to a different position from a position of the second diffraction grating.

Through this, the light guide member and the reflecting member can be manufactured easily, and those members can easily be positioned relative to each other as well.

The first diffraction grating may be a reflective diffraction grating, and the second diffraction grating may be a transmissive diffraction grating.

The first diffraction grating may be a transmissive diffraction grating, and the second diffraction grating may be a reflective diffraction grating.

The first diffraction grating and second diffraction grating may be transmissive diffraction gratings.

The second diffraction grating may be a reflective diffraction grating, and the reflecting member may include a first surface that reflects the zero-order light ray and a second surface, provided on a reverse side of the first surface, that reflects the interference light generated by the second diffraction grating.

A function of reflecting the zero-order light from the first diffraction grating and a function of reflecting the interference light from the second diffraction grating can both be realized by a single reflecting member, which helps reduce the size of the optical unit.

In another aspect, the present disclosure provides an optical unit, including: a first diffraction grating where light from a light source enters; a second diffraction grating that generates interference light as a result of diffracted light rays emitted from the first diffraction grating entering the second diffraction grating; and an optical member including a pair of reflective surfaces that are parallel and opposite to each other, the optical member being configured such that, of ±mth-order diffracted light rays that are diffracted light rays of a specific order emitted from the first diffraction grating, the +mth-order diffracted light ray is reflected by the pair of reflective surfaces and the −mth-order diffracted light ray passes between the pair of reflective surfaces, so as to guide the ±mth-order diffracted light rays to the second diffraction grating, where m is a natural number.

In another aspect, the present disclosure provides a displacement measuring device, including: a light source; a first diffraction grating where light from the light source enters; a second diffraction grating that generates interference light as a result of diffracted light rays emitted from the first diffraction grating entering the second diffraction grating; an optical member including a pair of reflective surfaces that are parallel and opposite to each other, the optical member being configured such that the pair of reflective surfaces respectively reflect ±mth-order diffracted light rays that are diffracted light rays of a specific order among a plurality of orders of the diffracted light rays emitted from the first diffraction grating so as to guide the ±mth-order diffracted light rays to the second diffraction grating, where m is a natural number; a detector that detects the interference light; and a calculation unit that calculates a relative displacement between the first diffraction grating and the second diffraction grating based on a signal obtained by the detector.

According to the present invention as described above, unnecessary light can be suppressed from being incident on a detector, which makes it possible to improve the measurement accuracy.

It is to be understood that both the foregoing general description and the following detailed description are exemplary and explanatory, and are intended to provide further explanation of the invention as claimed.

DETAILED DESCRIPTION OF EMBODIMENTS

Embodiments of the present invention will be described hereinafter with reference to the drawings.

Embodiment 1

Figure 1:
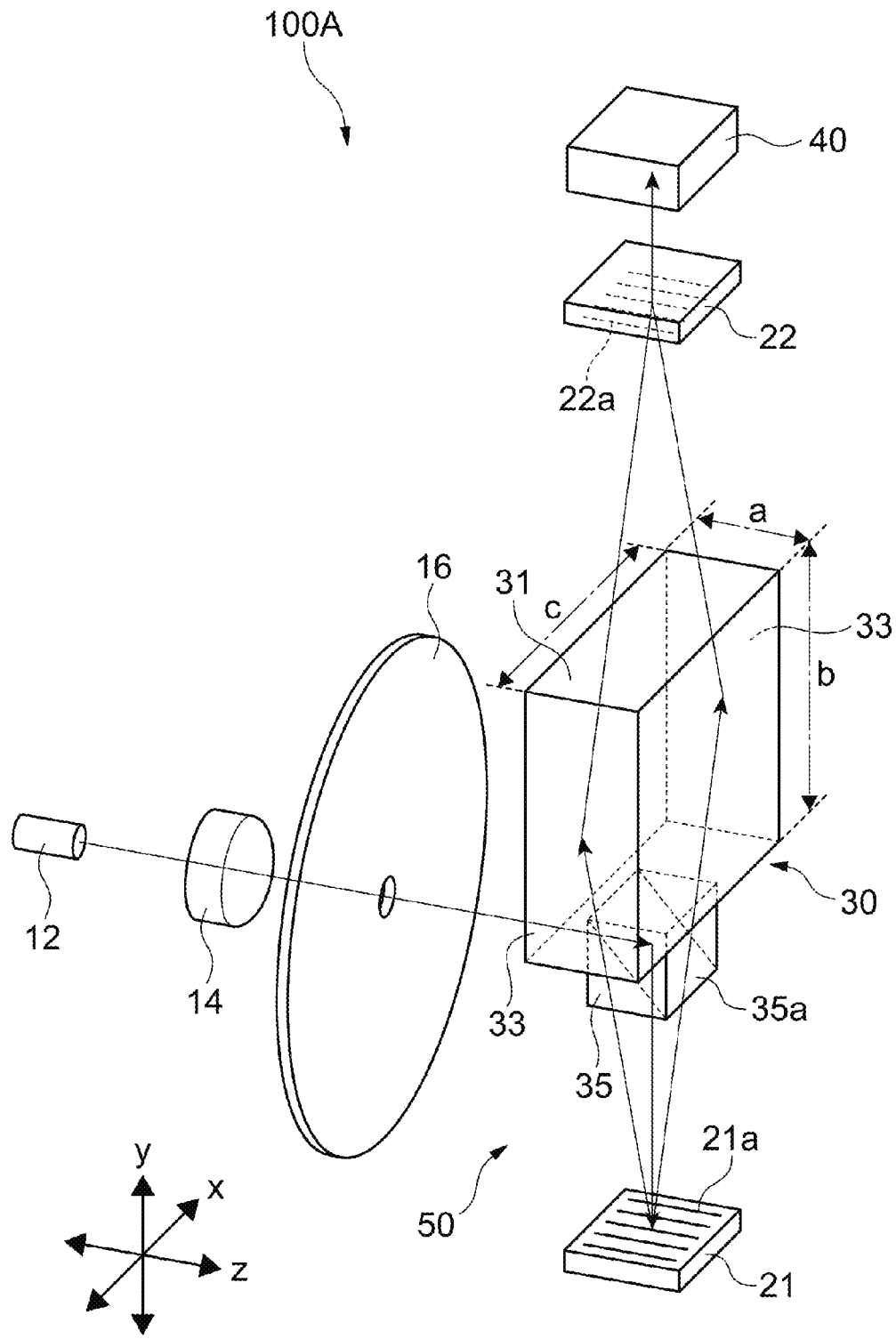
FIG. 1 is a perspective view illustrating a displacement measuring device including an optical unit according to Embodiment 1 of the present invention.
Figure 2:
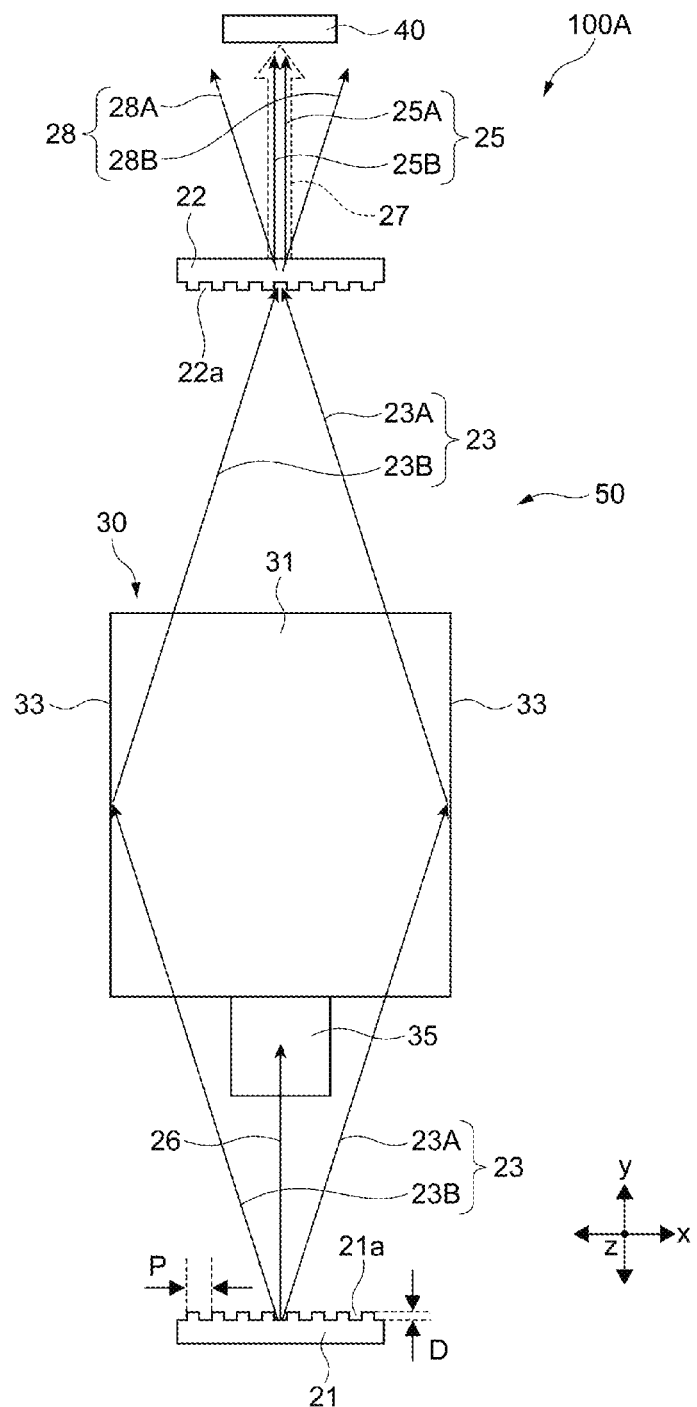
FIG. 2 illustrates the displacement measuring device from the Z-axis direction indicated in FIG. 1.

FIG. 1 is a perspective view illustrating a displacement measuring device including an optical unit according to Embodiment 1 of the present invention. FIG. 2 illustrates the displacement measuring device from the Z-axis direction indicated in FIG. 1. This displacement measuring device 100A includes a light source 12, an optical unit 50, and a PD (photodetector (or photodiode)) 40. The light source 12, a collimator lens 14, and an aperture member 16 are not shown in FIG. 2.

The light source 12 is an LD (Laser Diode) or an LED (Light Emitting Diode), and is driven by a driver (not shown). The light source 12 is a light-emitting element that emits a laser beam having a central wavelength set to 400 nm to 900 nm, for example, but of course is not limited to such a configuration.

The optical unit 50 includes the collimator lens 14, the aperture member 16, a first diffraction grating 21, a prism mirror 35, an optical member 30, and a second diffraction grating 22, for example. The optical member 30 constitutes part or all of an "optical unit."

The collimator lens 14 converts the beam emitted from the light source 12 into parallel light. An optical system that generates parallel light is constituted by at least the light source 12 and the collimator lens 14. The aperture member 16 has a function for constricting the beam diameter of the light emitted from the collimator lens 14 to a prescribed beam diameter. In principle, however, the collimator lens 14 and the aperture member 16 may be omitted.

The first diffraction grating 21 and the second diffraction grating 22 have a plurality of grating lines (grating grooves) 21a and 22a, respectively, that are formed at the same pitch P (see FIG. 2) and at the same orientation. The first diffraction grating 21 and the second diffraction grating 22 are configured such that the grating lines 21a and 22a can be displaced relative to each other in the direction in which the grating lines are arranged (the X direction in the drawings). The displacement measuring device 100A measures this relative displacement.

The first diffraction grating 21 is a reflective diffraction grating. The first diffraction grating 21 receives light from the aperture member 16 reflected by the prism mirror 35 and emits diffracted light. This diffracted light includes a plurality of orders of diffracted light, namely ±first-order, ±second-order, and so on up to ±nth-order (where n is a natural number) diffracted light. This diffracted light also includes zero-order diffracted light (called "zero-order light" hereinafter) 26 generated by regular reflection at the first diffraction grating 21.

To simplify the descriptions, assuming an axis line that follows the y axis in FIG. 2 and passes through the centers of the first diffraction grating 21 and the second diffraction grating 22, diffracted light on the right side of the line is positive (+) diffracted light and diffracted light on the left side of the line is negative (−) diffracted light.

The optical member 30 is configured to reflect ±mth-order diffracted light 23, which is diffracted light of a specific order from the multiple-order diffracted light emitted from the first diffraction grating 21, and guide that light to the second diffraction grating 22. The ±mth-order diffracted light 23 is typically ±first-order diffracted light, but may be ±second-order diffracted light, or diffracted light of another order, for example.

The optical member 30 includes a light guide member 31 having a rectangular cuboid shape, for example, and the prism mirror 35 that is connected thereto. In other words, the light guide member 31 and the prism mirror 35 are provided integrally.

The prism mirror 35 is attached to one side face of the light guide member 31 in the y direction, for example. As illustrated in FIG. 1, the prism mirror 35 has a mirror portion 35a disposed within a transparent member at, for example, a 45° angle relative to the z axis. Accordingly, the prism mirror 35 has a function of reflecting the light emitted from the aperture member 16 at a right angle toward the first diffraction grating 21, as mentioned above. The prism mirror 35 also functions as a reflecting member that reflects the zero-order light 26 emitted from the first diffraction grating 21 to a different position from the second diffraction grating 22, namely, back to the aperture member 16 in this example, so that the light is not guided to the second diffraction grating 22.

The two sides of the light guide member 31 in the x direction are provided as a pair of reflecting surfaces 33 and 33 that oppose and are parallel to each other. +mth-order diffracted light 23A and −mth-order diffracted light 23B generated by the first diffraction grating 21 are incident on the respective reflecting surfaces 33 and 33, and the pair of reflecting surfaces 33 and 33 guides those instances of diffracted light to the second diffraction grating 22.

The pair of reflecting surfaces 33 and 33 may completely or only partially reflect the ±mth-order diffracted light 23 from the first diffraction grating 21. Whether or not the light is completely reflected depends on the wavelength of the light, the structure of the diffraction grating, the arrangement and design of the various optical components, and so on. Alternatively, the reflective films constituted by metal films, for example, may be formed on the pair of reflecting surfaces 33 and 33.

The light guide member 31 may lack a transparent main body, and the pair of reflective surfaces may instead be two physically independent mirrors. However, using the sides of the light guide member 31 as the pair of reflecting surfaces 33 and 33, or in other words, providing the light guide member 31 and the pair of reflecting surfaces 33 and 33 integrally, makes it easy to manufacture the light guide member 31 including the pair of reflecting surfaces 33 and 33. This also makes it easy to position the pair of reflecting surfaces 33 and 33 relative to each other.

Likewise, although the light guide member 31 and the prism mirror 35 may be separate entities, providing these elements integrally makes it easy to manufacture the optical member 30, and also makes it easy to position the light guide member 31 and the prism mirror 35 relative to each other.

Silica glass is an example of the material of which the light guide member 31 is formed. However, another type of glass, a transparent material aside from glass, or the like may be used instead. A transparent material formed from a resin material can be selected, for example. When a central wavelength of the light emitted from the light source 12 is λ (where λ=633 nm, for example), it is preferable that the profile irregularity of the reflecting surfaces 33 and 33 be no greater than λ/4. If the profile irregularity of the reflecting surfaces 33 and 33 is low, interference light 27 (mentioned later) of a desired state cannot be obtained, which can cause a drop in measurement accuracy.

The parallelism (angle) of the reflecting surfaces 33 and 33 is no greater than one minute, and preferably is no greater than 30 seconds. The parallelism of the reflecting surfaces 33 and 33 is also an important factor in obtaining the interference light 27 of a desired state.

There is no particular limitation on a length a of the reflecting surfaces 33 and 33 of the light guide member 31, in the direction in which the first diffraction grating 21 and the second diffraction grating 22 are arranged (the y direction), and a length b in the direction orthogonal thereto (the z direction), which are illustrated in FIG. 1. For example, a=5 mm to 10 mm and b=2 mm to 5 mm, with a dimensional tolerance of ±0.1 mm. In this case, a grid line pitch of the first diffraction grating 21 and the second diffraction grating 22 is set to 1 µm to 5 µm; preferably, the pitch is 1.5 µm to 4 µm, and more preferably, is 2 µm. c is set depending on the wavelength of the light, the structure of the diffraction grating, the arrangement and design of the various optical components, and so on.

The second diffraction grating 22 is a transmissive diffraction grating. The second diffraction grating 22 has a function of generating and emitting the interference light 27 upon the ±mth-order diffracted light 23 emitted from the optical member 30 being incident thereon. Specifically, as illustrated in FIG. 2, zero-order light 28A that proceeds straight and ±pth-order diffracted light (where p is a natural number including m) are generated when the +mth-order diffracted light 23A is incident on the second diffraction grating 22. Likewise, zero-order light 28B that proceeds straight and ±pth-order diffracted light are generated when the −mth-order diffracted light 23B is incident on the second diffraction grating 22.

Note that the reflective first diffraction grating 21 may have a configuration in which a metal film is formed on a surface of a grating pattern region of a diffraction grating whose primary material is a transparent material, or the stated primary material may be a metal.

FIG. 2 illustrates only ±m'th-order diffracted light 25 (25A and 25B) of the ±pth-order diffracted light, which is the diffracted light emitted from the second diffraction grating 22 aside from the zero-order light 28 (28A and 28B). This "m'" indicates the same order as "m", which is the order of the diffracted light reflected by the pair of reflecting surfaces 33 and 33. Although the apostrophe is formally added to the order of the diffracted light emitted from the second diffraction grating 22 with respect to the order of the diffracted light emitted from the first diffraction grating 21 in order to simplify the descriptions, the respective orders are the same.

Specifically, the +mth-order diffracted light 23A from the first diffraction grating 21 is diffracted clockwise in FIG. 2 by the second diffraction grating 22, thus generating the +m'th-order diffracted light 25A. Likewise, the −mth-order diffracted light 23B from the first diffraction grating 21 is diffracted counterclockwise in FIG. 2 by the second diffraction grating 22, thus generating the −m'th-order diffracted light 25B. The +m'th-order diffracted light 25A and the −m'th-order diffracted light 25B are generated along the same optical path (the y direction, for example). To rephrase, the ±mth-order diffracted light 23 from the first diffraction grating 21 is reflected by the pair of parallel reflecting surfaces 33 and 33 of the light guide member 31, and thus the ±m'th-order diffracted light 25 is generated by the second diffraction grating 22 in the y direction.

In the case where the ±mth-order diffracted light 23 is ±first-order diffracted light as described above, the ±m'th-order diffracted light 25 is typically also ±first-order diffracted light. The interference light 27 is generated by the +m'th-order diffracted light 25A and the −m'th-order diffracted light 25B interfering.

The PD 40 detects the interference light 27 emitted from the second diffraction grating 22. When the first diffraction grating 21 and the second diffraction grating 22 move relative to each other in the x direction, the PD 40 obtains a light amount (corresponding to a light intensity) of a periodic nature, that takes a light-dark set as a single period, with each unit of pitch of the grid lines 21a (22a). A waveform having such a periodic nature is typically a sine curve. The PD 40 outputs a voltage signal having that waveform, for example, to a circuit (a computation unit) (not shown).

The circuit (not shown) includes an AD converter and a calculation circuit, for example. The calculation circuit is configured to output a displacement on the basis of the stated voltage signal. The AD converter and/or the calculation circuit may be provided integrally with the PD 40.

As described thus far, in the displacement measuring device 100A including the optical unit 50 according to the present embodiment, the mth-order diffracted light, which is diffracted light of a specific order, is reflected by the opposing and parallel pair of reflecting surfaces 33 and 33 provided in the light guide member 31, and is guided to the second diffraction grating 22. The zero-order light 26, meanwhile, is returned toward the aperture member 16 by the prism mirror 35. In other words, substantially only the ±mth-order diffracted light 23 is incident on the second diffraction grating 22, whereas other orders of diffracted light, including the zero-order light 26, which are not needed for measuring displacement, are blocked mechanically. The zero-order light 28 also travels at an angle relative to the y direction and therefore is not incident on the PD 40. Accordingly, noise caused by unnecessary light being incident on the PD 40 can be substantially eliminated, and the displacement can be measured more accurately.

<Comparison of Displacement Measuring Device Disclosed in Patent Document 2 to Embodiment 1>

A displacement measuring device according to Working Example 1 of the aforementioned Patent Document 2 has a problem in that unnecessary orders of diffracted light including zero-order light are generated by the second diffraction grating. The inventors of the present invention therefore attempted to solve this problem by changing the structure of the first diffraction grating and the second diffraction grating. For example, FIGS. 3 and 4 are graphs illustrating results of simulating a relationship between a diffraction efficiency and a depth D of grooves formed by the grating lines 21a and 22a (grating grooves) (see FIG. 2) as a structure for the first diffraction grating 21 and the second diffraction grating 22.

The diffraction efficiency on the vertical axis indicates the intensity of each order of diffracted light, including zero-order diffracted light, emitted from the second diffraction grating 22 in the case where the intensity of the light incident on the second diffraction grating 22 is 1. The grating line pitch in the diffraction grating was set to 4.8 μm. A polarization direction of the diffracted light (an oscillation direction of an electrical field vector) is perpendicular to the direction of the grating lines 21a and 22a.

Figure 3:
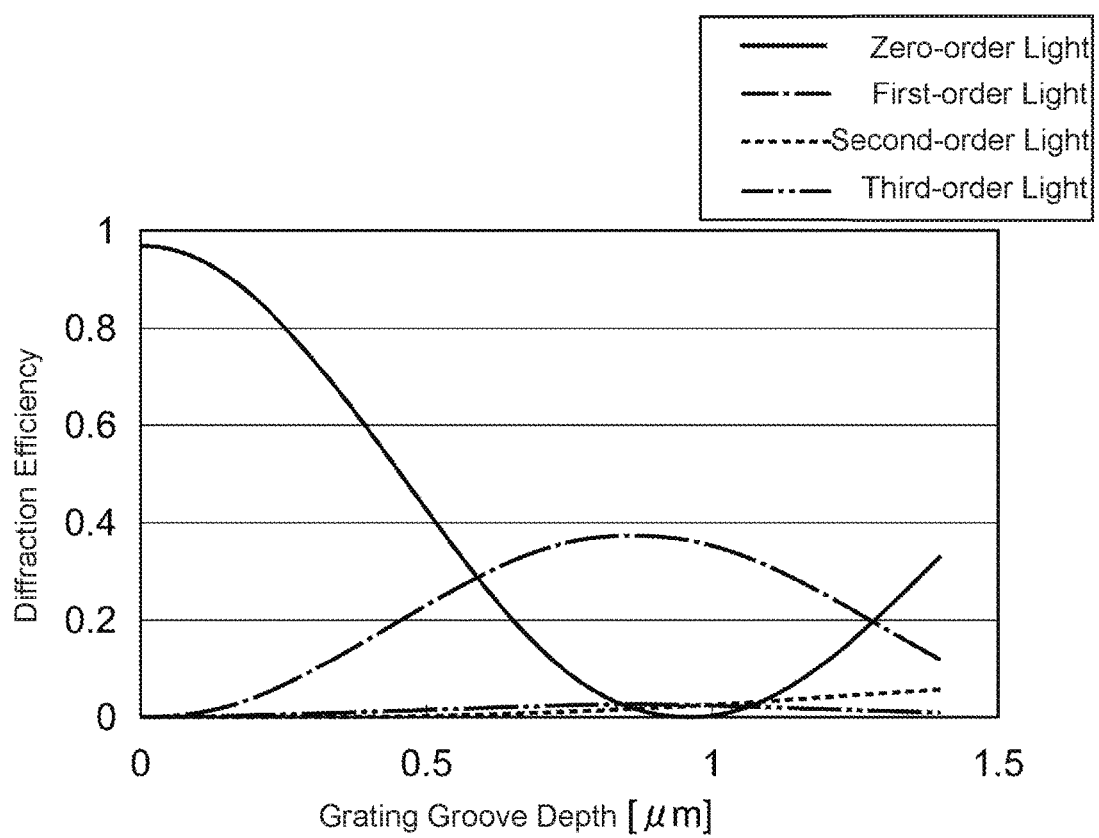
FIG. 3 is a graph illustrating results of simulating a relationship between grating groove depth and diffraction efficiency in a structure having a first diffraction grating and a second diffraction grating.

FIG. 3 assumes a case where, for example, ±first-order diffracted light is used as the ±mth-order diffracted light 23 (and the ±m'th-order diffracted light 25) to generate the interference light 27. As is clear from FIG. 3, even if the depth D of the grating grooves is adjusted, the diffraction efficiencies of the zero-order light, second-order diffracted light, and third-order diffracted light cannot in principle all be set to 0 at a given single depth D.

Figure 4:
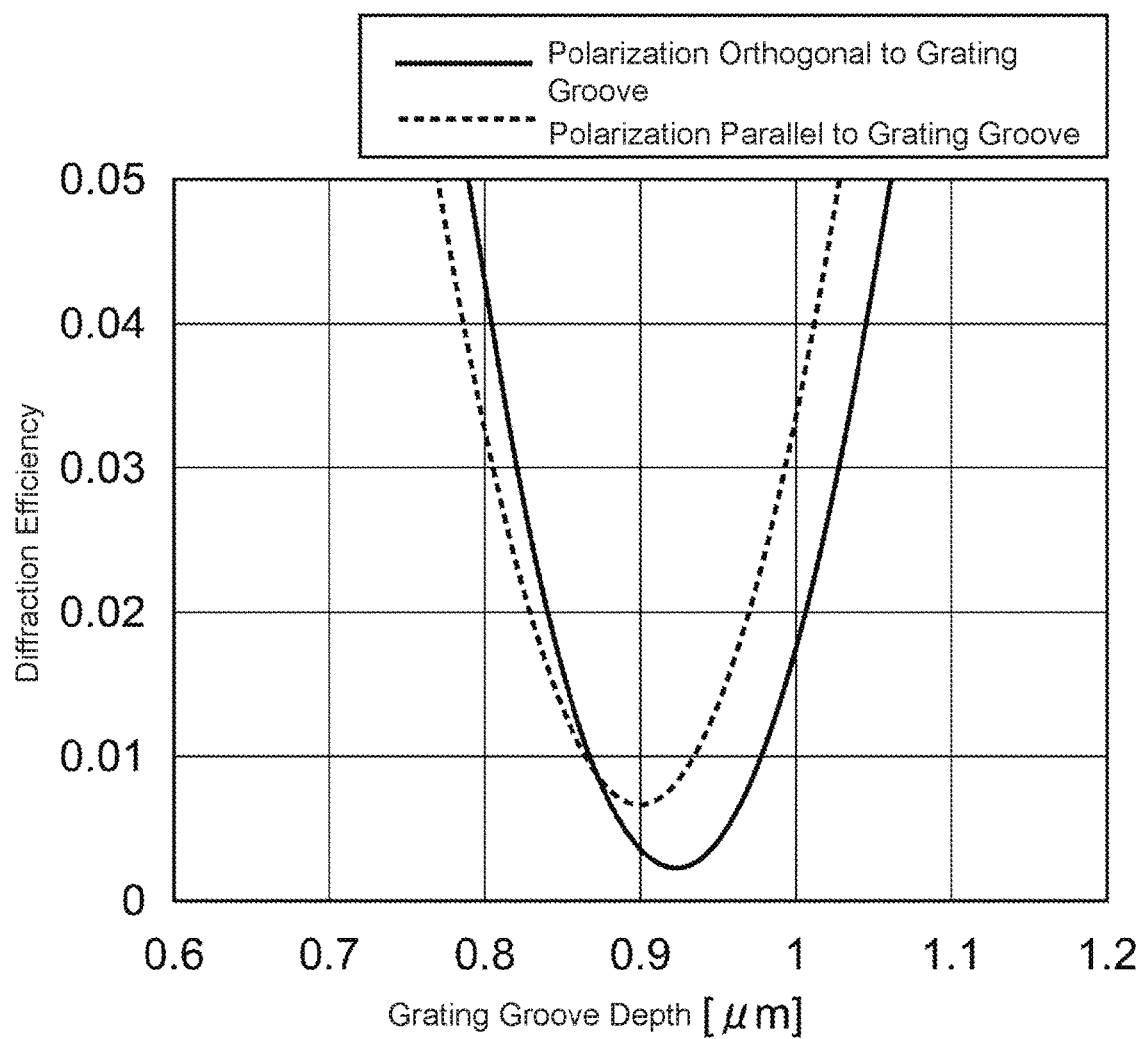
FIG. 4 is a graph illustrating a result of simulating only the diffraction efficiency of zero-order light, of the results indicated in FIG. 3.

FIG. 4 is a graph focusing on the zero-order light in a diffraction efficiency range of 0 to 0.05 in the graph in FIG. 3, and indicates both zero-order light whose polarization direction is orthogonal to the grating grooves and zero-order light whose polarization direction is parallel to the grating grooves. As illustrated in FIG. 4, the diffraction efficiency of the zero-order light cannot in principle be set to 0, even in the case where the depth of the grating grooves is adjusted as appropriate, for example.

On the other hand, the optical unit 50 according to Embodiment 1 as described thus far mechanically blocks light not needed to measure displacement, and thus the measurement accuracy can be improved without generating noise.

Note that in situations where a lower measurement accuracy than that required by the displacement measuring device 100A according to Embodiment 1 is sufficient, the displacement measuring device disclosed in Patent Document 2 can of course be used within the range of the required measurement accuracy.

Embodiment 2

Embodiment 2 of the present invention will be described next. In the following descriptions, substantially identical members and elements having substantially identical functions as those of the displacement measuring device 100A according to Embodiment 1 described above will be given the same reference numerals, descriptions thereof will be simplified or omitted, and the descriptions will focus on the differences.

Figure 5A:
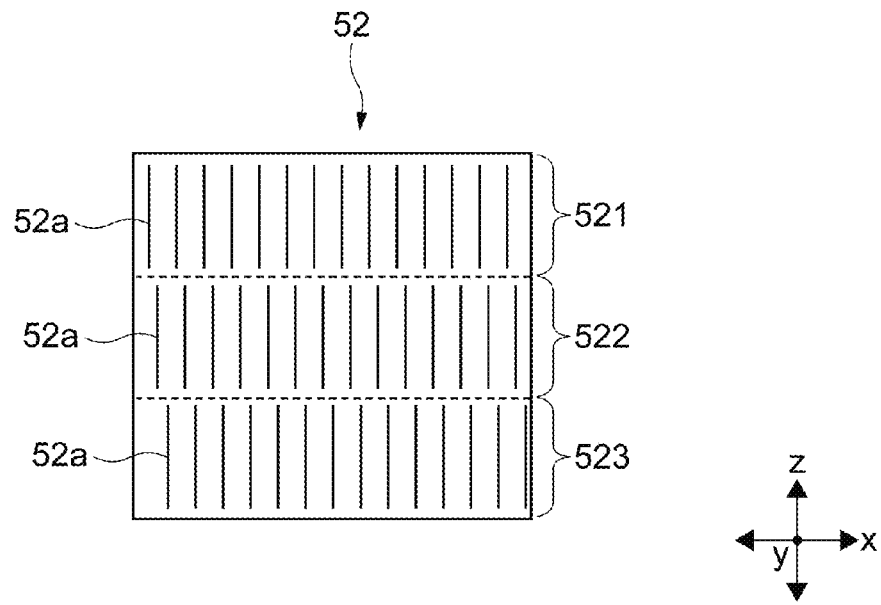
FIG. 5A illustrates grating pattern regions in a second diffraction grating in an optical unit according to Embodiment 2.
Figure 5B:
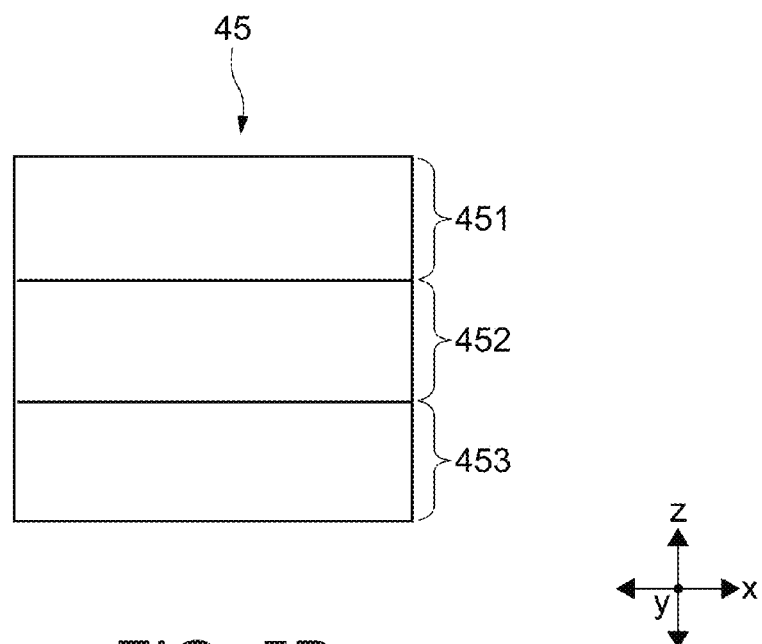
FIG. 5B illustrates light receiving regions of a PD according to Embodiment 2.

FIG. 5A illustrates grating pattern regions in a second diffraction grating in an optical unit according to Embodiment 2. A first diffraction grating (not shown) of this optical unit has the same configuration as the first diffraction grating 21 according to Embodiment 1. FIG. 5B illustrates light receiving regions of a PD according to Embodiment 2.

As illustrated in FIG. 5A, a second diffraction grating 52 includes three grating pattern regions 521, 522, and 523 arranged in the z direction, for example. A pitch of grating lines 52a is the same in each of the grating pattern regions 521, 522, and 523. However, the second diffraction grating 52 is configured so that the arrays of the grating lines 52a ("grating line arrays" hereinafter) are shifted by a prescribed distance, smaller than a single unit of pitch, in the direction in which the grating lines are arranged (the x direction), from grating pattern region to grating pattern region. Specifically, the grating line arrays are shifted by ⅓ a single unit of pitch from each other.

Meanwhile, as illustrated in FIG. 5B, a PD 45 has three light receiving regions 451, 452, and 453 arranged in the z direction, serving as a plurality of light receiving regions, that correspond to the grating pattern regions 521, 522, and 523, respectively, of the second diffraction grating 52.

In the second diffraction grating 52, the grating line arrays are shifted from grating pattern region to grating pattern region, and thus a plurality of interference light beams having different phases are generated. Here, the three grating pattern regions 521, 522, and 523 are provided in the second diffraction grating 52 and the grating line arrays are shifted by ⅓ of a single unit of pitch. Accordingly, when the first diffraction grating 21 and the second diffraction grating 52 move relative to each other in the x direction, the second diffraction grating 52 generates three interference light beams having phases shifted by 120° each. The light receiving regions 451, 452, and 453 of the PD 45 receive respective interference light beams having different phases.

Figure 6:
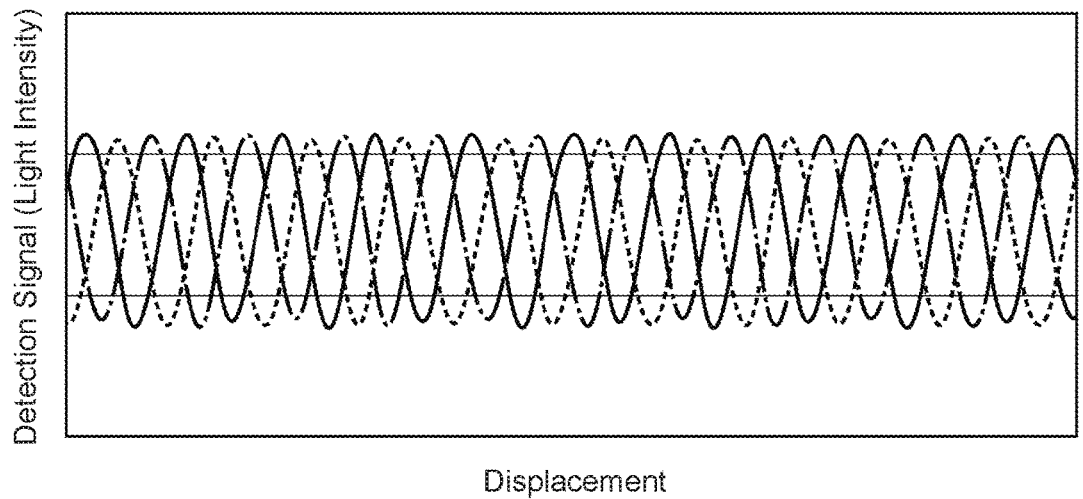
FIG. 6 is a graph illustrating results of measuring detection signals (voltage signals) obtained by a PD.

FIG. 6 is a graph illustrating results of measuring detection signals (voltage signals) obtained by the PD 45. Voltage signals with three distinct phases shifted by 120° each are obtained. The horizontal axis represents an amount of displacement between the first diffraction grating and the second diffraction grating 52.

Figure 7:
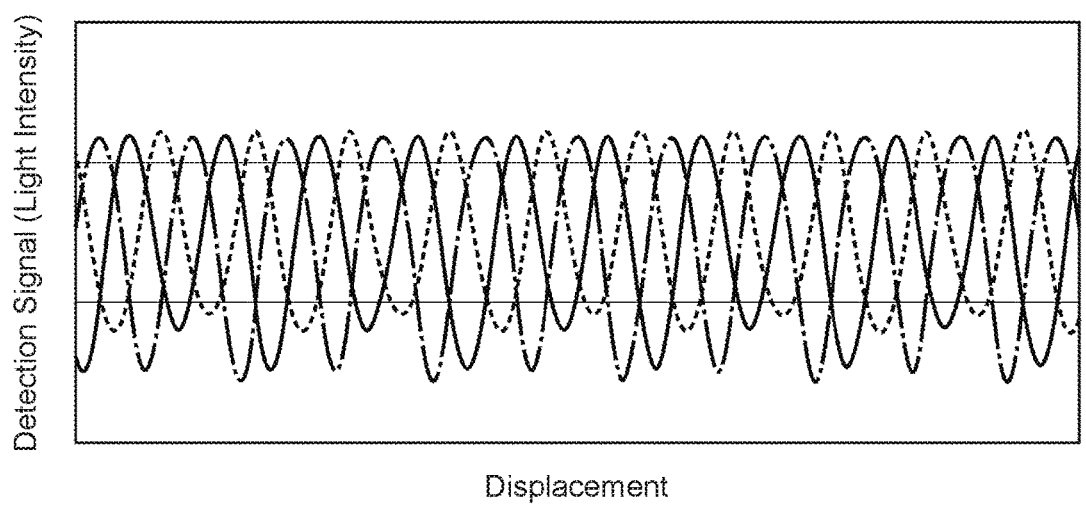
FIG. 7 is a graph illustrating results of measuring detection signals (voltage signals) of three phases obtained by a displacement measuring device according to a comparison example.

FIG. 7 is a graph illustrating results of measuring detection signals (voltage signals) of three phases obtained by a displacement measuring device according to a comparison example. A displacement measuring device having the structure of the displacement measuring device according to Working Example 1 of the aforementioned Patent Document 2, and in which the second diffraction grating and the PD have been replaced by the stated second diffraction grating 52 and PD 45, is given here as the comparison example. However, in this case, the direction of the relative displacement of the first diffraction grating and the second diffraction grating was set to the direction in which the grid lines are arranged.

As is clear from FIG. 7, the amplitude of the signal of each phase varies from period to period, and thus displacement cannot be measured with as high a level of accuracy as in Embodiments 1 and 2.

Note that in situations where a lower measurement accuracy than that required by the displacement measuring device including the optical unit according to Embodiment 2 is sufficient, the displacement measuring device disclosed in Patent Document 2 can of course be used within the range of the required measurement accuracy.

Meanwhile, four or more grating pattern regions may be provided in the second diffraction grating, and four or more light receiving regions may be provided in the PD. In this case, the four or more pattern regions and light receiving regions may be disposed in a matrix, for example.

Furthermore, the first diffraction grating may have the plurality of grating pattern regions rather than the second diffraction grating.

Embodiment 3

Figure 8:
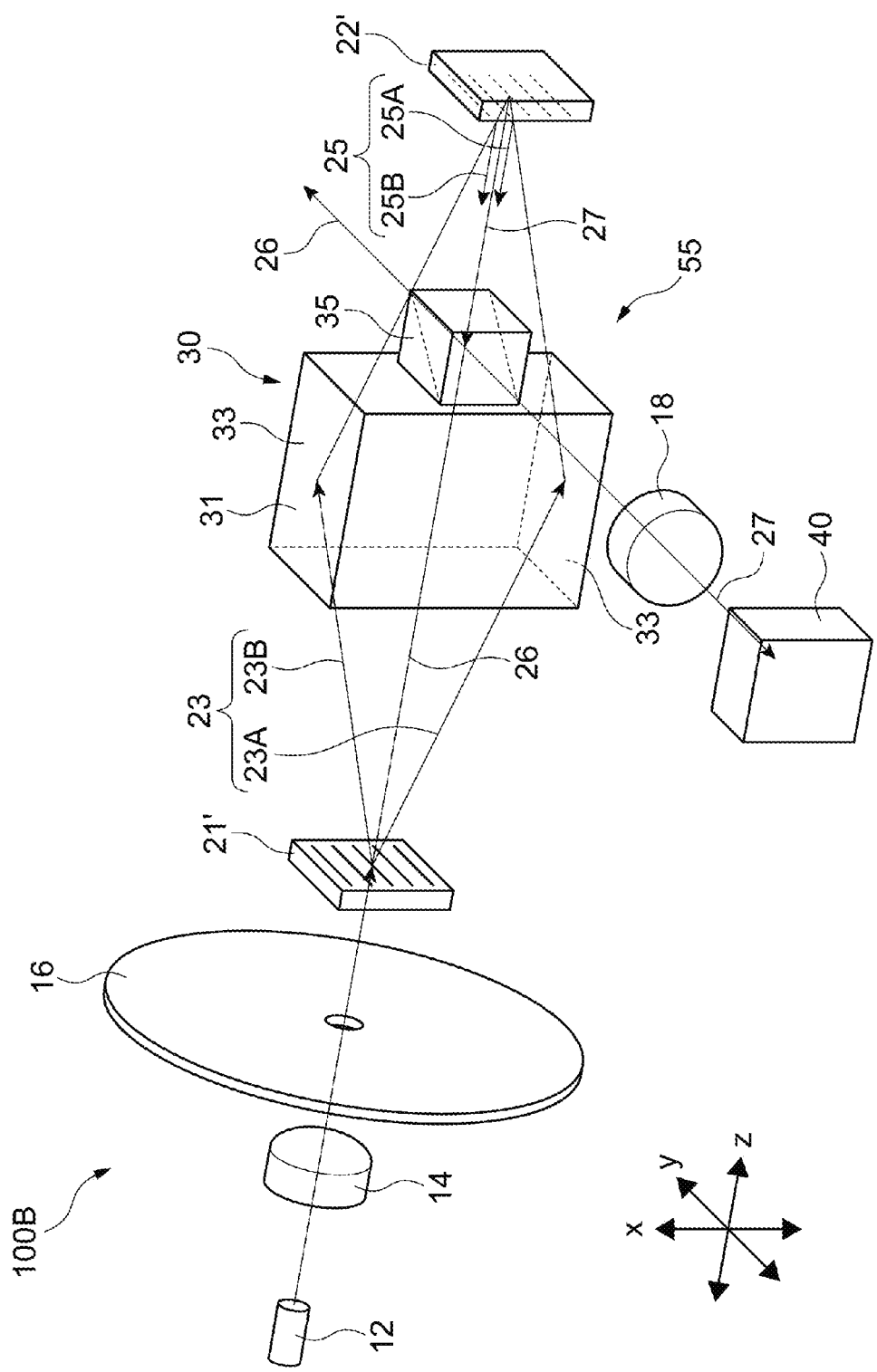
FIG. 8 is a perspective view illustrating a displacement measuring device including an optical unit according to Embodiment 3 of the present invention.

FIG. 8 is a perspective view illustrating a displacement measuring device including an optical unit 55 according to Embodiment 3 of the present invention.

The optical unit 55 of this displacement measuring device 100B includes a transmissive first diffraction grating 21' and a reflective second diffraction grating 22'. Although the first diffraction grating 21 and the second diffraction grating 22 are arranged in the y direction in the aforementioned Embodiment 1, the first diffraction grating 21' and the second diffraction grating 22' are arranged in the z direction.

The optical member 30 includes the light guide member 31, and the prism mirror 35 (reflecting member) disposed between the light guide member 31 and the second diffraction grating 22'. The prism mirror 35 is attached to the light guide member 31, for example, and is provided integrally therewith. The light guide member 31 has the pair of reflecting surfaces 33 and 33, and the ±mth-order diffracted light 23 (23A and 23B) emitted from the first diffraction grating 21' is reflected by the pair of reflecting surfaces 33 and 33 and guided to the second diffraction grating 22'.

The prism mirror 35 has a first surface and a second surface provided on the opposite side from the first surface. The first surface reflects the zero-order light 26 transmitted through the first diffraction grating 21' and traveling along the z direction to a different position from the second diffraction grating 22', namely, at a right angle in the y direction here, causing the light to travel in the opposite direction from the PD 40. The second surface reflects the interference light 27, which is obtained by the ±m'th-order diffracted light 25 (25A and 25B) generated by the second diffraction grating 22' interfering, at a right angle in the y direction, causing the light to travel toward the PD 40.

Zero-order light from the +mth-order diffracted light 23A generated by the second diffraction grating 22' returns along the optical path in which the −mth-order diffracted light 23B traveled. Zero-order light from the −mth-order diffracted light 23B generated by the second diffraction grating 22' returns along the optical path in which the +mth-order diffracted light 23A traveled.

Note that a collimator lens 18 for focusing light on the PD 40, for example, is provided between the prism mirror 35 and the PD 40.

Like the aforementioned embodiments, according to the present embodiment, providing the pair of reflecting surfaces 33 and 33 of the light guide member 31 mechanically blocks light not needed to measure displacement, and thus the measurement accuracy can be improved without generating noise. Furthermore, a function of reflecting the zero-order light 26 from the first diffraction grating 21' and a function of reflecting the interference light 27 from the second diffraction grating 22' can both be realized by a single prism mirror 35, which helps reduce the size of the optical unit 55.

Embodiment 4

Figure 9:
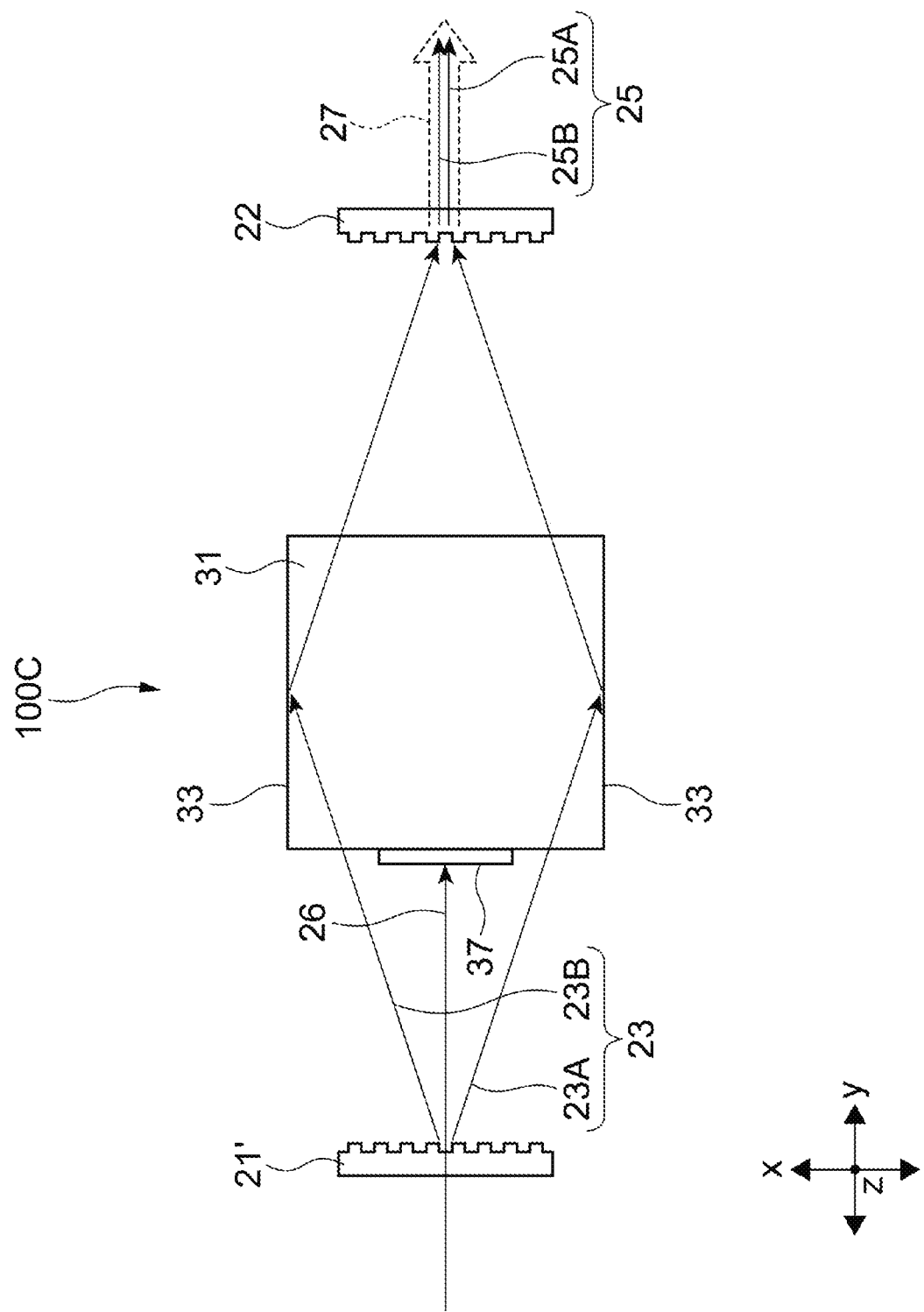
FIG. 9 illustrates the configuration of an optical unit in a displacement measuring device according to Embodiment 4 of the present invention.

FIG. 9 illustrates the configuration of an optical unit in a displacement measuring device according to Embodiment 4 of the present invention. The light source, the PD, and so on are not shown here.

The first diffraction grating 21' and the second diffraction grating 22 in the optical unit of this displacement measuring device 100C are both transmissive diffraction gratings. A mirror 37 (a reflecting member) is provided integrally with the light guide member 31. The zero-order light 26 emitted from the first diffraction grating 21' is reflected by this mirror 37 to a different position than the second diffraction grating 22, namely in the opposite direction as the optical path that light traveled on.

The ±mth-order diffracted light 23 (23A and 23B) emitted from the first diffraction grating 21' is reflected by the parallel pair of reflecting surfaces 33 and 33 of the light guide member 31 and guided to the second diffraction grating 22. The second diffraction grating 22 emits interference light 27 of the ±m'th-order diffracted light 25 (25A and 25B).

Note that a prism mirror that reflects in a right angle direction (the z direction) may be provided instead of the mirror 37, as in the above embodiments.

Embodiment 5

Figure 10:
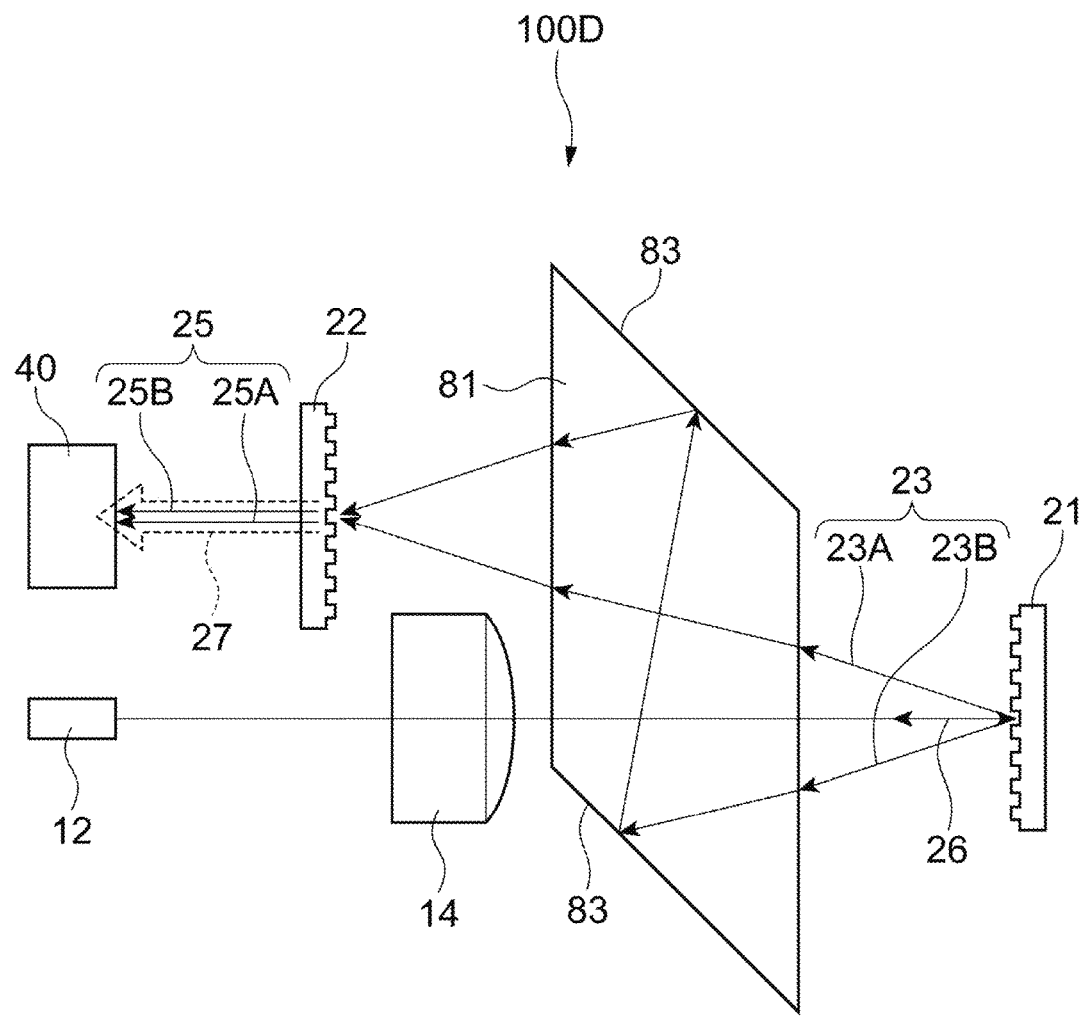
FIG. 10 illustrates the configuration of a displacement measuring device including an optical unit according to Embodiment 5 of the present invention.

FIG. 10 illustrates the configuration of a displacement measuring device including an optical unit according to Embodiment 5 of the present invention.

The optical unit of this displacement measuring device 100D includes a reflective first diffraction grating 21 and a transmissive second diffraction grating 22. A light guide member 81 (optical member) has a pair of parallel reflective surfaces 83 and 83, but the apex angles at the four corners of the light guide member are not right angles. In other words, the member is shaped as a parallelogram.

The zero-order light 26 generated by the first diffraction grating 21 advances along the z direction and returns toward the light source 12. One of the ±mth-order diffracted light 23 generated by the first diffraction grating 21, for example the −mth-order diffracted light 23B, is reflected by one of the reflective surfaces 83 and 83 of the light guide member 81, and then traverses the light guide member 81 and is reflected by the other of the reflected surfaces so as to be incident on the second diffraction grating 22. On the other hand, the +mth-order diffracted light 23A travels through the light guide member 81 between the pair of reflective surfaces 83 and 83 and is incident on the second diffraction grating 22. Note that a reflecting member that reflects the zero-order light 26 or an absorbing member may be provided integrally with or separate from the light guide member 81.

The same effects as in the above embodiments can be achieved by this configuration as well, and because the light source 12 and the PD 40 can be disposed near to each other, the displacement measuring device 100D can also be reduced in size.

Other Embodiments

The present invention is not limited to the embodiments described above, and various other embodiments can be implemented as well.

For example, in Embodiment 1, the second diffraction grating 22 may be replaced with a reflective diffraction grating. In other words, in this embodiment, both the first and second diffraction gratings are reflective. In this case, a prism mirror (see FIG. 3) is provided between the light guide member and the second diffraction grating, and the interference light from the second diffraction grating is reflected at a right angle by the prism mirror. In this embodiment, the light source and the PD can be disposed close to each other, and thus a configuration is possible in which, for example, the light source and the PD are mounted on a single shared mounting substrate. This makes it possible to reduce the size of the displacement measuring device.

In the above embodiments, the displacement direction for measurement is a direction in which the first diffraction grating 21 and the second diffraction grating 22 move relative to each other, in the direction in which the grating lines 21a and 22a are arranged. However, like the technical content of Patent Document 2, the intensity of the interference light also changes in response to relative movement in the direction in which the first diffraction grating and the second diffraction grating are disposed. Accordingly, in this case, the displacement measuring device can measure the relative displacement thereof by detecting the intensity thereof.

In the above embodiments, the light guide member 31 (81) and the prism mirror 35 (mirror 37) are connected and provided integrally, but these elements may be provided separately.

An absorbing member capable of absorbing light may be provided integrally with or separate from the light guide member 31 instead of the prism mirror 35 and the mirror 37.

At least two of the characteristic parts of the embodiments described above can also be combined with each other. For example, the second diffraction grating 52 and the PD 45 according to Embodiment 2 may be applied in Embodiment 3 or 5.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An optical unit, comprising:
   a first diffraction grating where light from a light source enters;
   a second diffraction grating that generates interference light as a result of diffracted light rays emitted from said first diffraction grating entering said second diffraction grating;
   an optical member including a pair of reflective surfaces that are parallel and opposite to each other, said optical member being configured such that said pair of reflective surfaces respectively reflect ±mth-order diffracted light rays that are diffracted light rays of a specific order among a plurality of orders of the diffracted light rays emitted from said first diffraction grating so as to guide the ±mth-order diffracted light rays to said second diffraction grating, where m is a natural number; and
   a reflecting member that reflects the zero-order light ray emitted from said first diffraction grating so as to guide the zero-order light ray to a different position from a position of said second diffraction grating.

2. An optical unit, comprising:
   a first diffraction grating where light from a light source enters;
   a second diffraction grating that generates interference light as a result of diffracted light rays emitted from said first diffraction grating entering said second diffraction grating;
   an optical member including a pair of reflective surfaces that are parallel and opposite to each other, said optical member being configured such that said pair of reflective surfaces respectively reflect ±mth-order diffracted light rays that are diffracted light rays of a specific order among a plurality of orders of the diffracted light rays emitted from said first diffraction grating so as to guide the ±mth-order diffracted light rays to said second diffraction grating, where m is a natural number, wherein said optical member includes a light guide member that has said pair of reflective surfaces; and
   a reflecting member provided integrally with said light guide member, said reflecting member reflecting the zero-order light ray emitted from said first diffraction grating so as to guide the zero-order light ray to a different position from a position of said second diffraction grating.

3. The optical unit according to claim 1,
wherein said first diffraction grating is a reflective diffraction grating, and
wherein said second diffraction grating is a transmissive diffraction grating.

4. The optical unit according to claim 1,
wherein said first diffraction grating is a transmissive diffraction grating, and
wherein said second diffraction grating is a reflective diffraction grating.

5. The optical unit according to claim 1, wherein said first diffraction grating and said second diffraction grating are transmissive diffraction gratings.

6. The optical unit according to claim 1,
wherein said second diffraction grating is a reflective diffraction grating, and
wherein said reflecting member includes a first surface that reflects the zero-order light ray and a second surface, provided on a reverse side of said first surface, that reflects said interference light generated by said second diffraction grating.

7. An optical unit, comprising:
a first diffraction grating where light from a light source enters;
a second diffraction grating that generates interference light as a result of diffracted light rays emitted from said first diffraction grating entering said second diffraction grating; and
an optical member including a pair of reflective surfaces that are parallel and opposite to each other, said optical member being configured such that, of ±mth-order diffracted light rays that are diffracted light rays of a specific order emitted from said first diffraction grating, the +mth-order diffracted light ray is reflected by the pair of reflective surfaces and the −mth-order diffracted light ray passes between said pair of reflective surfaces, so as to guide the ±mth-order diffracted light rays to said second diffraction grating, where m is a natural number.

8. A displacement measuring device, comprising:
the optical unit as set forth in claim 1;
said light source in claim 1;
a detector that detects said interference light; and
a calculation unit that calculates a relative displacement between said first diffraction grating and said second diffraction grating based on a signal obtained by said detector.

9. The optical unit according to claim 2,
wherein said first diffraction grating is a reflective diffraction grating, and
wherein said second diffraction grating is a transmissive diffraction grating.

10. The optical unit according to claim 2,
wherein said first diffraction grating is a transmissive diffraction grating, and
wherein said second diffraction grating is a reflective diffraction grating.

11. The optical unit according to claim 2, wherein said first diffraction grating and said second diffraction grating are transmissive diffraction gratings.

12. The optical unit according to claim 7,
wherein said first diffraction grating is a reflective diffraction grating, and
wherein said second diffraction grating is a transmissive diffraction grating.

13. The optical unit according to claim 7,
wherein said first diffraction grating is a transmissive diffraction grating, and
wherein said second diffraction grating is a reflective diffraction grating.

14. The optical unit according to claim 7, wherein said first diffraction grating and said second diffraction grating are transmissive diffraction gratings.

15. The optical unit according to claim 2,
wherein said second diffraction grating is a reflective diffraction grating, and
wherein said reflecting member includes a first surface that reflects the zero-order light ray and a second surface, provided on a reverse side of said first surface, that reflects said interference light generated by said second diffraction grating.

16. A displacement measuring device, comprising:
the optical unit as set forth in claim 2;
said light source in claim 2;
a detector that detects said interference light; and
a calculation unit that calculates a relative displacement between said first diffraction grating and said second diffraction grating based on a signal obtained by said detector.

17. A displacement measuring device, comprising:
the optical unit as set forth in claim 7;
said light source in claim 7;
a detector that detects said interference light; and
a calculation unit that calculates a relative displacement between said first diffraction grating and said second diffraction grating based on a signal obtained by said detector.

* * * * *